Oct. 8, 1968  T. F. SPARKS  3,404,429
BOVINE HIDE REMOVAL METHOD
Filed June 22, 1967  4 Sheets-Sheet 2
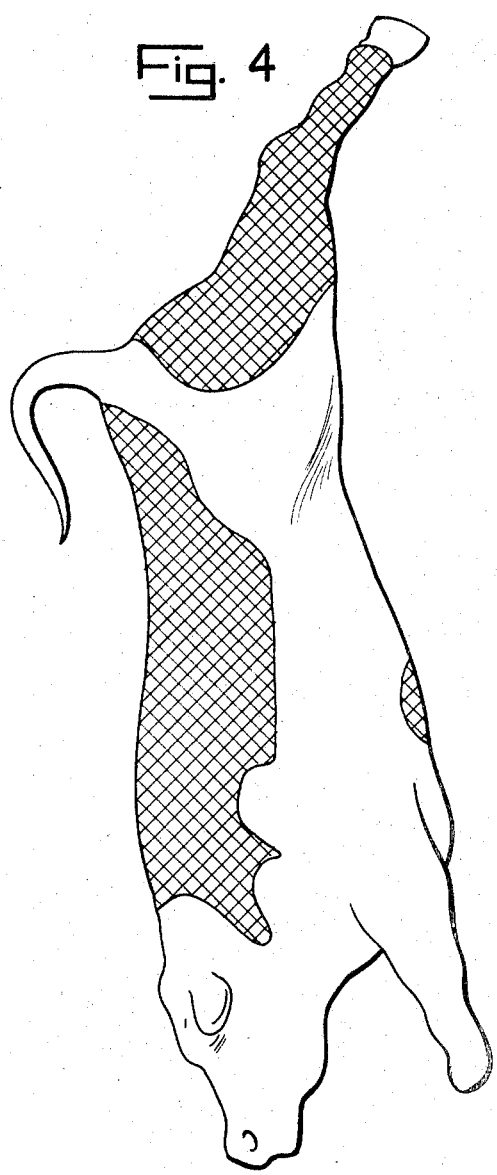
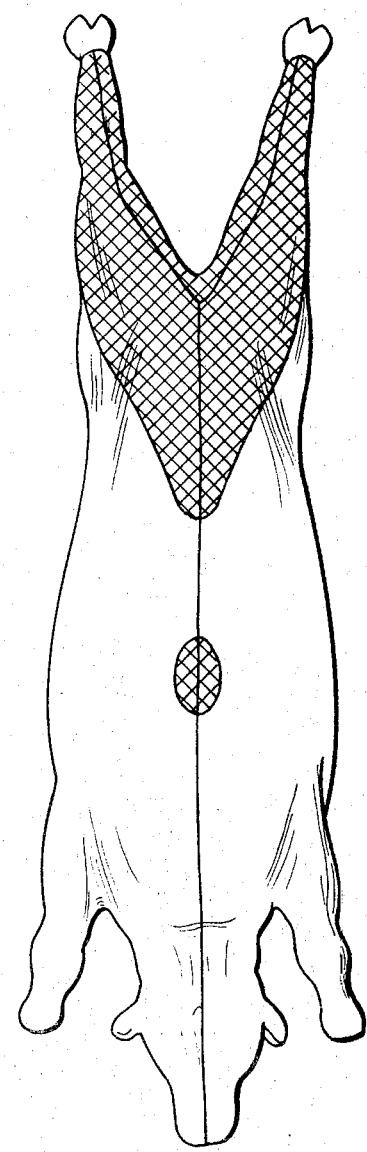
Fig. 4
Fig. 5
INVENTOR.
THOMAS FRANKLIN SPARKS
BY
*Carl C. Batz*
ATTORNEY

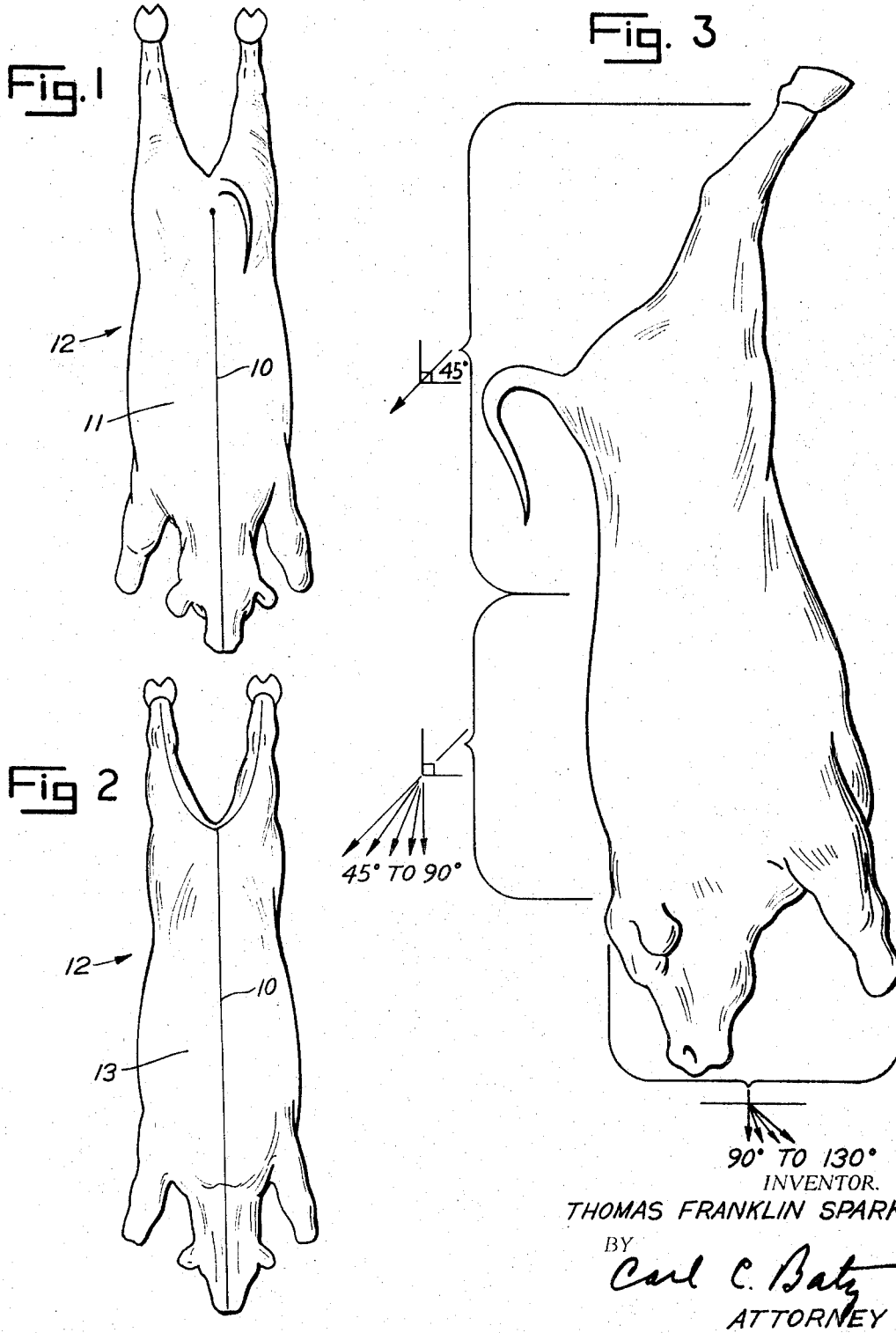

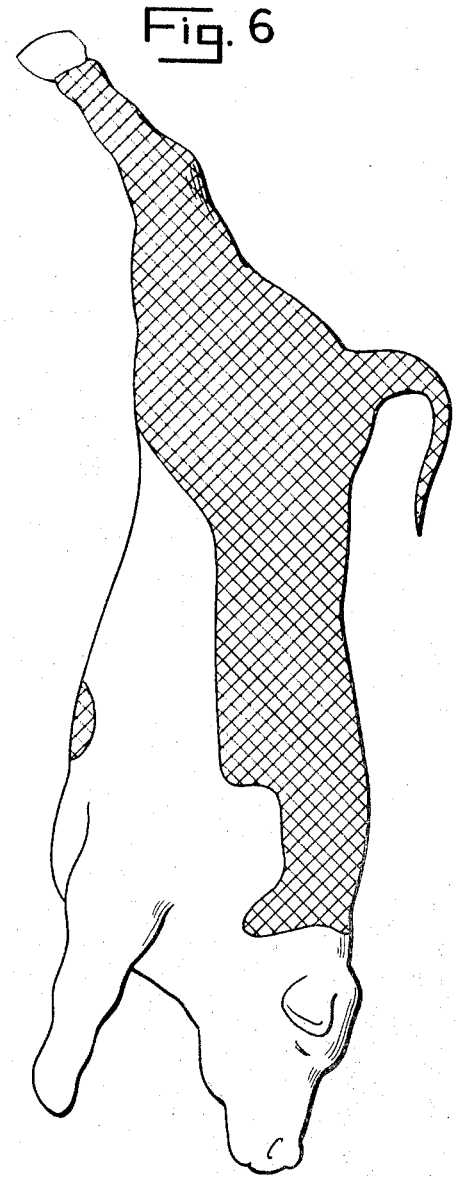
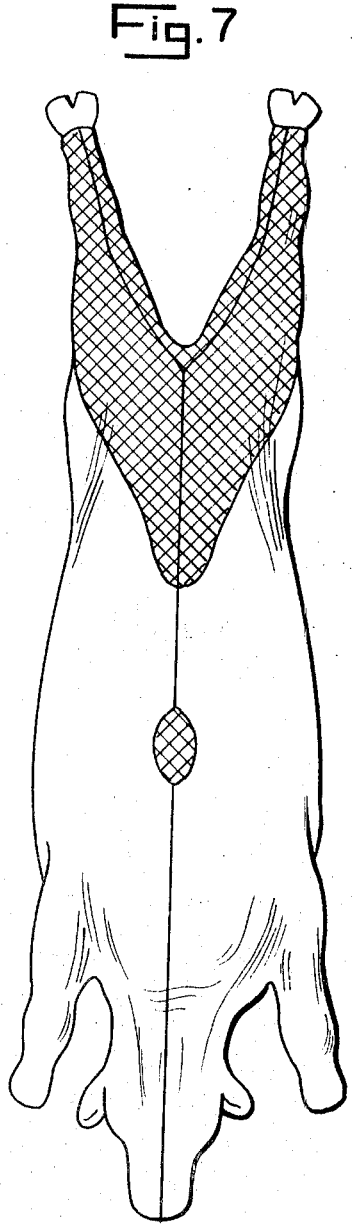

Oct. 8, 1968     T. F. SPARKS     3,404,429

BOVINE HIDE REMOVAL METHOD

Filed June 22, 1967     4 Sheets-Sheet 4

INVENTOR.
THOMAS FRANKLIN SPARKS
BY Carl C. Batz
ATTORNEY

United States Patent Office 3,404,429
Patented Oct. 8, 1968

3,404,429
BOVINE HIDE REMOVAL METHOD
Thomas Franklin Sparks, Woodridge, Ill., assignor to Armour and Company, Chicago, Ill., a corporation of Delaware
Continuation-in-part of application Ser. No. 563,511, July 7, 1966. This application June 22, 1967, Ser. No. 648,091
7 Claims. (Cl. 17—45)

ABSTRACT OF THE DISCLOSURE

This invention relates to a method for removing the hides from the carcass of bovine cattle suspended from an overhead conveyor prior to removal of their legs and head. The method comprises the steps of slitting the hide in a substantially longitudinal direction and pulling off the hide downwardly until entirely removed from the carcass including the head. For optimum results, the hide is pulled downwardly at an angle that increases as the hide is pulled from certain portions of the carcass, and certain areas of hide are hand cleared before pulling.

*Cross reference to related application*

This invention is a continuation-in-part of the application filed July 7, 1966, Ser. No. 563,511, and entitled, "Hide Removal Method."

*Background of the invention*

This invention relates to a new method for removing the hides from the carcasses of bovine cattle suspended from an overhead conveyor prior to removal of their legs and heads.

Removing hides from bovine cattle such as steers, cows, bulls, heifers and the like has been accomplished by essentially the same methods used for generations. One of the earliest methods still in practice generally comprises the steps of laying the carcass on the floor of the skinning area, severing the head and portions of the fore legs and hind legs, slitting open the hide along the underside of the carcass, removing the entrails, and then a combination of skinning and/or pulling the hide from the carcass until completely removed therefrom.

A more recent method currently in use in many packing houses is generally the same as the one just described except that the carcass is suspended from its hind legs and the hide is pulled upwardly from the backside of the carcass until removed therefrom after having first secured the fore legs to a stationary structure to prevent the carcass from moving up with the hide. Slitting, skinning, referred to as "clearing," and removing the entrails is usually done by hand and with a knife. Pulling the hide upwardly and off the carcass is usually done by a mechanical hide puller attached to a portion of the hide which has been cleared from the lower end of the carcass.

Before the hide is pulled from the carcass, however, all of the hide covering the underside of the carcass must be first cleared. If this were not done and the mechanical puller were activated, part of the fat and/or meat on the carcass might be torn therefrom and removed with the hide. After this preparatory step has been completed the mechanical puller is activated and begins to pull the hide upwardly and off the sides and back of the carcass. Pulling upwardly on the hide covering the back has a tendency to pull off fat and/or meat from certain areas on the carcass and attendants must stand by and follow the hide as it is being pulled to clear any areas of hide which do not separate readily from the carcass.

One major problem introduced by present methods is contamination of the carcass. Hides usually have manure, dirt and the like on their surface prior to removal from the carcass. When the carcass is suspended from its hind legs this debris is shaken loose as the hide is pulled upwardly and off the carcass, and falls on and adheres to the moist and sticky flesh and fat of the skinned carcass.

This is a health hazard requiring additional man hours to clean the carcass and rid it of debris. This cleaning process usually comprises manually cutting any foreign matter from the skinned carcass and then washing the carcass with a stream of water under pressure.

The present methods also tend to reduce the value of the hide and of the cuts of meat subsequently made from the skinned carcass. On the back of the carcass of bovine cattle exists a layer of fat between the hide and the flesh. This fat layer becomes thinner on the sides of the carcass until the underside is reached where there is generally little or no fat at all. The fat and flesh are covered by a thin membrane referred to as the "fell" which exists immediately under the hide. Present methods slit the hide on the underside and clear it by using a hand knife to free it from the flesh. However, the hide in this area is only separated from the flesh by the fell and the hide may be cut and damaged if the knife is used too close thereto. If the knife is used too far from the hide and into the flesh, valuable meat will be lost to the carcass and carried with the hide where it is of no value.

Thus, because of the closeness of the hide to the flesh on the underside of the carcass, and the difficulty in avoiding damage to the hide without cutting too much meat from the carcass, this hand-skinning step has proven to be very slow and tedious. As a compensation, many attendants are stationed at various parts of the underside to simultaneously clear various portions of the hide to permit a high rate of hides to be removed per unit of time.

A further problem introduced by these procedures is the maintenance of the knives used to slit the underside. These knives can be simple butcher knives but are more often "air knives" having scissor-like blades actuated by air pressure. The underside of the carcass usually has a good deal of gritty material mixed with the debris and gets into the mechanism of the knives requiring them to be serviced frequently to be kept in proper operating condition.

Another step in present methods comprises pulling the hide off the back side of the carcass from the front to the rear or pulling the hide upwardly when the carcass is suspended from its hind legs. This direction of pull is used because of the "grain" of the fell in cattle. It is believed that the fell has a "grain" or internal arrangement of such a nature that it facilitates a sharp separation with the hide when pulled toward the rear or upwardly thereby allowing the fell to be left on the skinned carcass and form a natural casing surrounding the fat and flesh of the carcass.

In practice, however, it is found that when the hide is pulled in this manner, separation of the hide from the carcass tends to occur in the layer of fat underneath the fell and not at the interface of the hide and fell. As a consequence, much of the fat is removed with the hide and lost to the carcass. Furthermore, cuts of meat made from the back of the carcass are commercially the most valuable and the loss of fat amounts to a substantial loss in their value. Attendants stationed alongside the carcass as the hide is pulled off the back attempt to minimize this loss by following the hide and clearing areas of fat and/or meat which appear to be coming off with the hide but this only reduces the loss but does not eliminate it.

As a result of the necessity for clearing certain areas of the hide by hand to prevent damage to the hide or loss of fat and/or flesh, the area of hide that is actually pulled by present day mechanical means is relatively small in contrast to the hand cleared area and does not amount to much of an improvement over the days when the hide was entirely cleared by hand.

Summary of the invention

In view of all the foregoing problems associated with present day hide removal procedures, it is an object of the present invention to provide a new method for removing hides from the carcass of bovine cattle that will result in a skinned carcass relatively free of contamination and requiring very little cleaning.

Another object of the present invention is to provide a new method for removing hides from bovine cattle that will reduce the amount of hide area that must be hand cleared before being mechanically pulled by about one half.

Another object of the present invention is to provide a new method for removing hides from the carcass of bovine cattle that will increase the value of the hides by reducing the amount of damage to the hides.

A further object of the present invention is to provide a new method for removing hides from the carcass of bovine cattle that will increase the value of the skinned carcass by decreasing the amount of flesh and/or fat ripped from the carcass by the hide while being removed.

Other objects and advantages of the invention will become apparent as the specification proceeds.

The previous application, 563,511, describes a new method for removing the hides from the carcass of livestock and generally comprises the steps of slitting the hide longitudinally along the back of the carcass, skinning the hide adjacent to the slit until substantially off the back portion of the carcass, and pulling off the hide downwardly from the underside of the carcass until removed therefrom.

It has been further discovered that optimum results from the foregoing method can be achieved in the case of bovine cattle by slitting either the back or the underside of the carcass in a substantially longitudinal direction and pulling off the hide from the carcass in a downward direction at an angle that increases after a portion of the hide is pulled from the carcass as will be described in more detail hereinbelow.

In the preferred operation of this new method, the carcass is suspended by its hind legs from an overhead conveyor and the entrails and members such as the head and the legs are left intact and are not removed prior to removal of the hide.

Description of the drawings

The invention will be more specifically described in connection with the accompanying drawings, in which:

FIGURE 1 is an elevational view of the back of a carcass suspended by its hind legs from an overhead conveyor (not shown) and depicts a longitudinal slit along its backside.

FIGURE 2 is an elevational view of the underside of said carcass and depicts a longitudinal slit along its underside.

FIGURE 3 is an elevational view of the side of said carcass and depicts the downward pull at different angular dispositions along the carcass.

FIGURE 4 is an elevational view of the side of said carcass showing as cross-hatched areas the portions of hide to be hand cleared, when the back is facing the pulling means.

FIGURE 5 is an elevational view of the underside of said carcass showing as cross-hatched areas the portions of hide to be hand cleared when the back is facing the pulling means.

FIGURE 6 is an elevational view of the side of said carcass showing as cross hatched areas the portions of hide to be hand cleared when the underside is facing the pulling means.

FIGURE 7 is an elevational view of the underside of said carcass showing as cross hatched areas the portions of hide to be hand cleared when the underside is facing the pulling means.

Preferred embodiment

Figure 8:
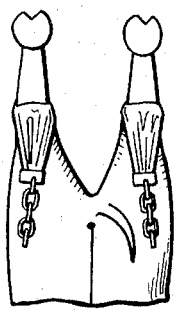
FIGURE 8 is a view of the backside of the hind legs of said carcass having the hide pulled back from said legs and showing the clamps of a mechanical hide puller (not shown) attached to said hide.

In the preferred embodiment of the instant invention, a longitudinal slit 10 is made along the back 11 and underside 13 of the carcass 12 by hand and by means of a knife. The slit on the back generally follows the spine and is made for the entire length of the carcass including the head and hind legs but does not extend into the area where the tail joins the carcass. The slit on the underside is generally made in the middle portion thereof and runs for the entire length of the carcass including the head and crotch on top of the suspended carcass until joining the slits on the back of the hind legs as shown in FIGURES 1 and 2. Thus the hide will be in two halves when removed from the carcass and will be joined only by the strip of hide in the tail area which enables the hide to be more readily controlled when being removed from the carcass. The invention, however, is not limited thereto but comprehends a slit which extends through the tail area.

After the longitudinal slit has been made on the back and underside of the carcass, the cross hatched areas of hide as shown in FIGURES 4 and 5 or in FIGURES 6 and 7 are then hand cleared. In FIGURE 4, this hand clear area comprises the hide over the hind legs, the back except for the area around the chuck, the prescapular area, and the brisket. In FIGURES 5 and 7, the hand clear areas are the same and comprise the hide over the hind legs, the crotch, the cod, and the brisket. In FIGURE 6 the hand clear areas are the same as in FIGURE 4 but also include the tail, the rump, and the area above the flank.

The particular areas cleared will depend on whether the hide is pulled when the back of the carcass of the underside of the carcass is facing the hide pulling means. If the back is facing the pulling means, optimum results are achieved if the areas shown in FIGURES 4 and 5 are cleared. If the underside is facing the pulling means, optimum results are achieved if the areas shown in FIGURES 6 and 7 are cleared. In each case, however, the areas cleared on the underside of the carcass as shown in FIGURES 5 and 7 are the same. It has been found that fat and/or meat on the aforesaid areas tend to rip off with the hide when pulled by the method of the instant invention and should therefore be cleared beforehand for best results.

To pull the hide off the carcass, it has been discovered that an optimum separation between the hide and the carcass will occur if the hide is pulled downwardly at an angle that increases with respect to the horizontal after the hide is pulled from each of the following portions of the carcass: the top end to the center area of the back; the center area of the back to the head; and the head and forelegs, just prior to the termination thereof. As shown in FIGURE 3, this optimum separation will occur if the direction of pull has the following angular disposition with respect to the horizontal: about 20° to about 45° from the top end of the carcass until reaching the center portion of the back; a uniformly increasing angle of from about 45° to about 90° until reaching the head; and a uniformly increasing angle from about 90° to about 135° until the hide is removed from the head and forelegs.

Figure 9:
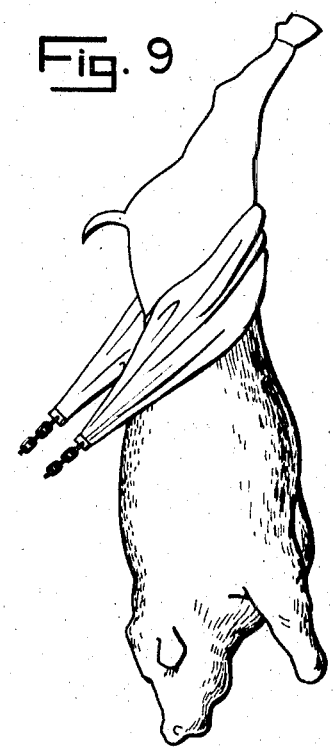
FIGURES 9 through 11 are elevational views of said carcass and depict various stages of removal of the hide therefrom.
Figure 10:
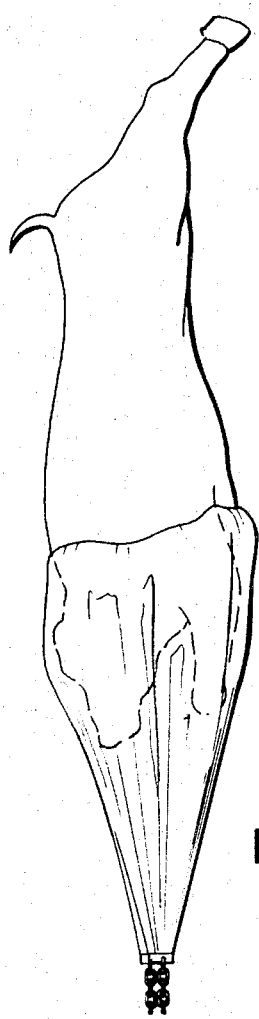
Figure 11:
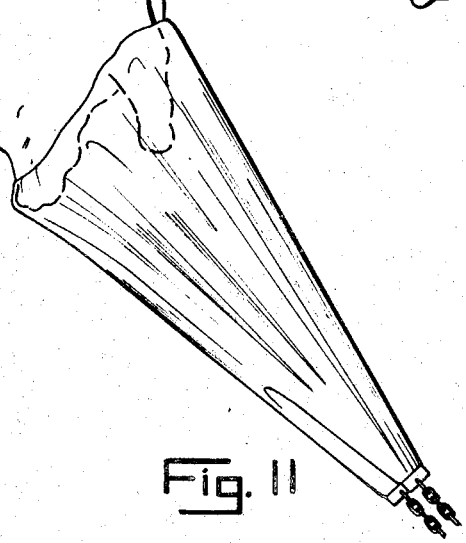

In proceeding to pull the hide from the carcass, a mechanical hide pulling means 14 (only clamps shown) is attached to a small portion of hide cleared from around the end portion of each hind leg as shown in FIGURE 8. When the hide pulling means is activated it begins to pull the hide downwardly at the aforesaid angular dispositions until removed therefrom. The position of the hide as it is being removed from different positions of the carcass is depicted in FIGURES 9 through 11.

The skinned carcass is in a relatively clean condition but is briefly washed with water to rid the carcass of excess blood and what little debris in the air that may adhere to the sticky surface of the carcass.

In the preferred embodiment of the method of the instant invention, air knives have been described as the means by which the back of the hide has been slit and skinned from the carcass. However, the invention is not limited thereto but comprehends any other suitable means which can perform this operation.

In working the method of the instant invention, the exact location and angular disposition of the slits on the back and underside of the carcass are not critical but are preferably in the center position of the back and underside and are substantially longitudinal in direction. In addition, the areas of hide which should be hand cleared and the angular direction of pull need not be exactly as shown and described hereinabove as these areas and directions may vary somewhat and still be within the scope of the present invention.

Furthermore, the invention is not limited to an angular direction of pull that changes after portions of the hide are cleared from the areas of carcass described hereinabove, but also comprehends an angular direction of pull that increases after the hide is pulled from the upper end portion of the carcass and also from the lower end portion thereof, and an angular direction of pull that increases not only after portions of the hide are pulled from the carcass, but also an angular direction that increases as the hide is pulled therefrom.

It is preferred that the carcass be slit along the backside and the underside. This is an operating convenience as is enables the hide to be pulled without concern to whether the backside or underside is facing the pulling means, and enables the operator to readily clear the desired areas of hide. The invention is not limited thereto, however, but comprehends a carcass having only one slit along one of said sides.

The method of the instant invention is well suited for large scale commercial packinghouse operations where carcasses are processed continuously from overhead conveyors. However, the invention is not limited to this environment but can be utilized in any setting where hides are to be removed from the carcass of cattle.

In another embodiment of the instant invention, the hide is cleared and pulled from the carcass in the conventional manner except for the area on and about the head and forelegs. The hide on and about these areas have proven particularly difficult to clear by hand or pull by conventional techniques. By the method of the present invention, however, the hide in these areas is removed by pulling downwardly.

The benefits and advantages of the method of the instant invention are considerable when compared with prior modes of operation.

First of all, a skinned carcass that is much cleaner results from working the invention. The invention teaches a step which pulls the hide downwardly as contrasted with the upward pulling of one of the prior methods. As a result, the debris shaken loose from the hide falls not on the skinned carcass but on the hide not yet stripped from the carcass. Furthermore, what little debris that may stick to the skinned carcass is very easily removed by briefly washing the carcass with water. There is considerable debris on the skinned carcass produced by the prior methods which requires extensive washing and even hand trimming of some areas that will not wash clean.

Secondly, the method of the instant invention mechanically pulls about twice the area of hide that could be mechanically pulled by prior methods without any assistance from attendants standing by to hand clear areas that could not be pulled satisfactorily. This results in corresponding efficiency of being able to remove a higher rate of hides per unit of time with less operating personnel.

Thirdly, the skinned carcass resulting from working the invention is of more value because more fat is left on the carcass. The method of the invention clears primarily the back of the carcass and relatively little of its underside. The layer of fat underneath the hide on the back is very easily cut and makes this area much easier to skin close to the hide to minimize the amount of fat left on the hide. Thus, the retention of more fat on the back of the carcass adds substantially to its value as the cuts of meat therefrom are commercially the most valuable.

While the embodiment of the invention chosen herein for purpose of the disclosure are at present considered to be preferred, it is to be understood that this invention is intended to cover all changes and modifications in said embodiments which fall within the spirit and scope of the invention.

What is claimed is:

1. In a method for removing the hide from suspended livestock carcasses the steps of:
    (a) slitting the hide longitudinally along the carcass,
    (b) applying a downward pulling force to the hide at an angle that increases with respect to the horizontal as further portions of hide are pulled from the carcass.

2. The method as set forth in claim 1 wherein the hide is slit longitudinally along the backside and underside of the carcass.

3. The method as set forth in claim 1 wherein the hide is pulled downwardly at an angle that increases with respect to the horizontal after the hide is pulled from the upper end portion of the carcass and also from the lower end portion thereof.

4. The method as set forth in claim 1 wherein the hide is pulled downwardly at an angle that increases with respect to the horizontal after the hide is pulled from each of the following portions of the carcass:
    (a) the top end to the center area of the back,
    (b) the center area of the back to the head, and
    (c) the head and forelegs, just prior to the termination thereof.

5. In a method for removing the hide from suspended livestock carcasses, the steps of:
    (a) slitting the hide longitudinally along the carcass, and
    (b) applying a downward pulling force to the hide at an angle measured from the horizontal of:
        (1) about 20° to about 45° from the top end of the carcass until reaching the center portion of the back,
        (2) uniformly increasing from about 45° to about 90° until reaching the head, and
        (3) uniformly increasing from about 90° to about 135° until said hide is removed from the head and forelegs.

6. The method as set forth in claim 5 wherein the hide over the backside of the carcass is manually cleared therefrom prior to the application of said pulling force.

7. The method as set forth in claim 1 wherein said pulling force is provided by mechanical hide pulling means.

References Cited

UNITED STATES PATENTS

| | | | |
|---|---|---|---|
| 77,724 | 5/1868 | Eschenlohr | 17—45 |
| 3,046,597 | 7/1962 | Macy et al. | 17—21 |
| 3,192,558 | 7/1965 | Niccollai | 17—21 |
| 3,209,395 | 10/1965 | Jones et al. | 17—21 |
| 3,336,628 | 8/1967 | Perardi | 17—21 |

LUCIE H. LAUDENSLAGER, *Primary Examiner.*